(12) United States Patent
Achard et al.

(10) Patent No.: US 8,381,598 B2
(45) Date of Patent: Feb. 26, 2013

(54) METHOD OF MEASURING THE FLOW RATE OF A LIQUID FLOWING IN A FLUIDIC CHANNEL AND IMPLEMENTATION DEVICE

(75) Inventors: Jean-Luc Achard, Grenoble (FR); Pierre Joly, Grenoble (FR); Jean-Maxime Roux, Grenoble (FR)

(73) Assignees: Commissariat a l'Energie Atomique et aux Energies Alternatives, Paris (FR); Centre National de la Recherche Scientifique, Paris (FR); Biomerieux, March-l'Etoile (FR)

( * ) Notice: Subject to any disclaimer, the term of this patent is extended or adjusted under 35 U.S.C. 154(b) by 190 days.

(21) Appl. No.: 13/002,196

(22) PCT Filed: Jun. 19, 2009

(86) PCT No.: PCT/FR2009/000743
§ 371 (c)(1),
(2), (4) Date: Apr. 6, 2011

(87) PCT Pub. No.: WO2010/000977
PCT Pub. Date: Jan. 7, 2010

(65) Prior Publication Data
US 2011/0174082 A1   Jul. 21, 2011

(30) Foreign Application Priority Data
Jul. 2, 2008  (FR) .................................... 08 03761

(51) Int. Cl.
*G01F 1/58* (2006.01)
(52) U.S. Cl. .................................... 73/861.12

(58) Field of Classification Search ............... 73/861.12, 73/861.11, 861.17
See application file for complete search history.

(56) References Cited

U.S. PATENT DOCUMENTS

| 6,369,579 B1 * | 4/2002 | Riegel ........................... 324/439 |
| 6,634,238 B2 * | 10/2003 | Budmiger .................. 73/861.17 |
| 7,250,775 B1 | 7/2007 | Collins et al. |
| 8,046,194 B2 * | 10/2011 | Rufer et al. ................... 702/184 |

FOREIGN PATENT DOCUMENTS
EP          1 754 957      2/2007
WO    WO 2005/026665    3/2005

OTHER PUBLICATIONS
International Search Report for International Application No. PCT/FR2009/000743.

\* cited by examiner

*Primary Examiner* — Jewel V Thompson
(74) *Attorney, Agent, or Firm* — Alston & Bird LLP (57) ABSTRACT

The present invention provides a method of measuring the flow rate of an electrically conductive liquid in laminar flow and to an implementation measurement device that are easy to implement, simple to produce and compact. For this purpose, the invention provides a device for measuring the flow rate, comprising: a channel (1); a pair of electrodes (2a-2b); and at least one device (3) for measuring the voltage (V) between the electrodes (2a-2b) of said pair, an electrical double layer forming at the interface of each electrode with the conducting liquid. The device comprises means (4, 5) designed so that, when the conducting liquid is flowing through the channel, the flow velocity fields in the diffuse layers facing each electrode are different and so that the convective/diffusive charge equilibria of the electrical double layer at the interface of each electrode are different.

26 Claims, 4 Drawing Sheets

METHOD OF MEASURING THE FLOW RATE OF A LIQUID FLOWING IN A FLUIDIC CHANNEL AND IMPLEMENTATION DEVICE

FIELD OF THE INVENTION

The invention relates to a method of measuring the flow rate of a liquid flowing in a fluidic channel having a millimeter-to-micron-sized transverse dimension and to a device for implementing said method.

In particular, this method is employed for the precise and displayable measurement of liquid volumes in chemical or biological assay protocols.

BACKGROUND OF THE INVENTION

Methods of assaying chemical or biological molecules are based, in general, on the application of protocols for blending chemical or biological reagents in liquid solution, in well-defined concentrations and in a well-defined reaction volume. By way of example, in the case of enzyme detection as used in the ELISA test method, the concentration of the enzyme product that has to be measured is inversely proportional to the volume in which the reaction takes place. Errors in measuring the volumes of the various reagents used therefore have a direct impact on the result of the measurement.

In addition, in the case of biological or chemical assays for medical diagnostics, it is advantageous, and increasingly necessary, to be able to certify, for each test result, that the biochemical protocol used to obtain this result was correctly followed. This traceability of the protocol procedure means that ways must be found for accurately measuring the volume of each of the reagents used, and for guaranteeing that they have been correctly dispensed in the reaction volume.

To meet this need to control the measurement volume a vast range of technical solutions have been developed. Manual solutions are generally based on the defined geometry of the volume drawn up or dispensed (volumetric pipettes, manual or motorized pipettes having a set or adjustable volume, syringe pipettes, multichannel pipettes). These systems generally provide a measurement volume which is reproducible, precise, on the condition that the tool is regularly calibrated, and obtained with a low throughput.

In automated systems with a higher throughput, the draw-up and the dispensing of volumes are preferably carried out by very reproducible systems, the volumes drawn up and dispensed being regularly checked by an associated measurement system. The volume drawn up or dispensed may be measured in the reservoir into which the volume is drawn up or in the receptacle into which the volume is dispensed: the contents may be weighed, or the level of the contents may be checked using an optical method or electrical contacts or impedance measurement.

These methods have a number of drawbacks: high precision for small volumes (between 10 and 100 µl) is achieved with difficulty and these methods are sensitive to effects linked to high throughputs. Mention will be made, among others, of the liquid meniscus being disturbed by the movement of the receptacle or the violence of the dispensing, the formation of bubbles or, in the case of weight measurement, the inertia of the receptacle and of the volume dispensed.

Another solution consists in determining the volume drawn up or dispensed by measuring the time-profile of the liquid flow rate in the sampling tool.

Many methods have been developed for measuring the flow rate of liquids flowing in tubes and channels of various sizes. These methods are based on various physical principles: heat transfer, mechanical, optical or electrical methods and, more precisely, magnetohydrodynamic or electrokinetic methods.

The thermal, mechanical and optical methods have the advantage of being independent of the electrical conductivity of the liquids, which may be different from one liquid to another. They have, on the other hand, the drawback of being technically complex to implement.

In addition, such systems are difficult to miniaturize. In systems for drawing up and dispensing small volumes, the liquid is generally drawn up from the bottom of a thin tube or a narrow-necked flask, and, once drawn up, is in the flared end of a cone or needle.

Mechanical, thermal or optical systems are generally too bulky to be placed directly at this location and must therefore be remote, thereby requiring an indirect measurement, via a liquid or air piston, of the volumetric flow rate at the top of the device.

Electrical methods are strongly dependent on the conductivity of the solutions, but they are the easiest to put in place and implement, especially in a miniaturized format, which makes it possible to implement them near the free end of the aspirating/dispensing device that forms the input to the sampling instrument.

Electrokinetic methods are associated with the movements of an electrolyte in a region near a solid surface. An electrical double layer is characteristic of this region.

This electrical double layer is explained in the article "Effets de la double couche électrique sur un écoulement de Poiseuille" (Electrical double layer effects in a Poiseuille flow) by C. Lattes, S. Colin, S. Geoffroy and L. Baldas, in La Houille Blanche (Hydroelectric Power), $\underline{1}$ (2006) pp 47-52. It may be summarized as follows.

When a conductive liquid, even a very weakly conductive liquid such as ethanol, is brought into contact with a solid sidewall such as a metal, a metal oxide, a biased semiconductor or, finally, solid sidewalls made of carbon, graphite or carbon nanotubes, the sidewall acquires an electric charge. The metal may be for example gold, platinum or stainless steel; the metal oxide may be ITO (indium tin oxide); and, the semiconductor may be silicon or diamond. Mention may also be made of solid sidewalls made of carbon, graphite or carbon nanotubes. The charge on the sidewall depends, in particular, on the ionization and therefore the pH of the solution, and on the ability to adsorb, onto the sidewall, or to dissolve, into the liquid, ions at the sidewall-liquid interface. For example, in the case of silicon in contact with water, the dissociation of molecules at the sidewall produces a negatively charged surface according to the reaction: $SiOH$ (at the surface) $+OH^- \rightleftharpoons SiO^-$ (at the surface) $+H_2O$.

This results in a local modification of the ion concentration in the solution. The region affected by this redistribution of charge in the liquid is called the electrical layer. The Stern model is used in most studies and it presents this layer as a electrical double layer (EDL) comprising:

a thin, compact layer (called the Stern layer), having a thickness $x_H$, composed of ions adsorbed on the surface of the sidewall and aligned along a plane (called the Stern plane); and a diffuse layer (called the Gouy-Chapmann layer) in which the ions are mobile.

Thus, movements applied mechanically or resulting from electric fields can be observed only in the diffuse Gouy-Chapmann layer and not in the Stern layer adjacent the sidewall because convection therein is always negligible.

The charges on the surface of the sidewall are balanced by charges adsorbed in the Stern layer and by charges in the diffuse layer, thus maintaining the electroneutrality of the whole. This state is called convective-diffusive charge equilibrium (CDE) in the electrical double layer at the sidewall interface. For a given liquid/sidewall pair, it is a characteristic of the flow. The CDE depends on convection (that operates in the flow direction) and on diffusion (that operates perpendicular to the flow direction).

The distribution of ions in the solution creates an electric field the magnitude of which decreases with distance from the sidewall.

The plane separating the Stern from the Gouy-Chapmann layer is a shear plane. The electrical potential at this plane, characteristic of the CDE, is the zeta potential ζ, also called the electrochemical or electrokinetic potential.

The thickness of the electrical double layer is defined as:

$$\delta = \sqrt{(\epsilon \epsilon_\zeta k_h T / 2 n_0 e^2 z^2)},$$

where $n_0$ is the initial concentration, z is the valence of the ions, e is the charge on an electron, $k_b$ is Boltzmann's constant and T is the temperature.

According to Stern, at a distance equal to three times δ the electrical potential ψ has decreased by 98% relative to its value $\psi_0$ at the surface of the electrode. Thus δ is characteristic of the thickness of the liquid layer in which the variation in electrical potential is significant.

Depending on the properties of the liquid, the thickness δ of the electrical double layer varies from a few nanometers to about a micron.

J. Collins and A. P. Lee proposed, in their article entitled "Microfluidic flow transducer based on the measurement of electrical admittance" published in Lab on a Chip, 4 (2004) pp 7-10, a device that measured the capacitance formed between two bare electrodes placed transversely relative to the flow and between which a potential was applied from outside. The flow modifies this capacitance by affecting the thickness of the double layer.

This first device has the drawback of being dependent on the liquid the flow rate of which it is desired to measure, since the current measured is proportional to the conductivity of the liquid. Furthermore, by applying a current between the electrodes, there is a risk of hydrolyzing the solution.

Karin D. Caldwell and Marcus N. Myers proposed, in their article entitled "Flowmeter Based on Measurement of Streaming Potentials" published in Anal. Chem., 58 (1986) pp 1583-1585, a device that measured the potential between two bare electrodes placed longitudinally relative to a flow, that is to say one electrode was upstream of the other relative to the flow direction of the liquid. These electrodes were placed in a sleeve that had to be placed longitudinally, between two sections of a channel, and that had a diameter greater than that of the channel.

The potential that appears is linked to mobile electric charges being carried within the liquid from one electrode to the other. This streaming potential opposes the flow of the solution.

This second device also has the drawback of being dependent on the liquid the flow rate of which is desired to measure, since the voltage measured is inversely proportional to the conductivity of the liquid. Furthermore, it is necessary to allocate a certain length for integration of the measurement sleeve into the channel.

SUMMARY OF THE INVENTION

The aim of the present invention is to alleviate the aforementioned drawbacks and to provide a method of measuring flow rate and a measurement device implementing the method that are easy to employ, simple to produce, and sufficiently compact to be placed at the input of a sampling system, directly in contact with the liquid drawn up or dispensed, and compatible with measurements of small volumes (of the order of a microliter).

Preferably, the invention also aims to provide a method of measuring flow rate and a measurement device implementing said method which are independent of the physical properties of the liquids, provided that the latter are conductive.

To this end, one subject of the invention is a method of measuring the flow rate of an electrically conductive liquid flowing in the laminar flow regime, along a defined direction, in a device comprising a fluidic channel having a millimeter-to-micron-sized transverse dimension, and at least a pair of measurement electrodes, an electrical double layer forming at the interface of each electrode with the conductive liquid, method in which the electrodes of the device are placed such that the geometry characteristics of the channel, in the direction of the flow, next to one of the electrodes are different to the geometry characteristics of the channel, in the direction of the flow, next to the other electrode of said pair, so that the flow velocity fields in the diffuse layers facing each electrode are different, and so that the convective-diffusive charge equilibrium of the electrical double layer at the interface of each electrode is different, the method comprising the following steps:

a) establishing the flow of the liquid;
b) measuring a voltage between the electrodes of said pair of electrodes; and
c) deducing the flow rate of the liquid therefrom.

The flow rate of the liquid follows a relationship giving the flow rate as an increasing function of the voltage—which relationship is obtained either by a calibration process, or by modeling the coupled electrokinetic and hydrodynamic effects.

By convention, the steps of the following method are carried out in alphabetical order.

According to other embodiments:

the device may furthermore comprise a reference electrode, step b) also consisting in measuring the voltage between one of the electrodes of said pair of measurement electrodes and the reference electrode, and the voltage between the other electrode of said pair of measurement electrodes and the reference electrode, and step c) furthermore consisting in using the voltages measured in step b) to deduce the flow rate of the liquid independently of the conductivity of the liquid;

the device may comprise a single pair of measurement electrodes, at least one of the electrodes of said pair being placed on a relief that protrudes into the channel;

the device may comprise a single pair of measurement electrodes, the channel of the device being provided with a bend, and one of the electrodes of said pair being placed on at least a part of an inner flow surface of the bend, the other electrode of said pair being placed on at least a part of an outer flow surface of the bend.

the device may comprise a single pair of measurement electrodes, and the channel of the device may be provided with at least two successive half-bends, each electrode of said pair being placed on at least a part of an outer flow surface of each half-bend;

the device may comprise a single pair of measurement electrodes, and a structure for accelerating the flow of the liquid in contact with one of the electrodes of said pair relative to the flow of the liquid in contact with the other electrode of said pair;

the device may comprise a single pair of measurement electrodes and a structure for recirculating the liquid in contact with one of the electrodes of said pair, a direct flow being maintained in contact with the other electrode of said pair; and/or the method may implement at least two of the various methods above.

The invention also relates to a device for measuring the flow rate of an electrically conductive liquid flowing in the laminar flow regime, along a defined direction, comprising a channel, a pair of measurement electrodes, and at least one device for measuring the voltage between the electrodes of said at least one pair, an electrical double layer forming at the interface of each electrode with the conductive liquid, characterized in that it comprises means arranged so that, when the conductive liquid flows in the channel, the flow velocity fields in the diffuse layers facing each electrode are different, so that the convective-diffusive charge equilibrium of the electrical double layer at the interface of each electrode is different.

In other words, the variation of the sidewall geometry, along the flow axis, next to one of the (concave, convex, planar) electrodes is different to the variation of the sidewall geometry, along the flow axis, next to the other electrode so that the velocity fields, along the flow axis, in the diffuse layers facing each electrode are different and so that, consequently, the convective-diffusive charge equilibriums, maintaining electroneutrality, are different.

According to other embodiments:

said means may consist of at least one relief placed on the surface of the channel in contact with the liquid and protruding into the channel;

one of the electrodes of said pair may be placed on a surface in relief, and the other electrode of said pair may be placed on the surface of the channel, facing the first electrode;

one of the electrodes of said pair may be placed on an upstream side of the relief relative to the flow direction of the liquid, and the other electrode of said pair may be placed on a downstream side of the relief relative to the flow direction of the liquid;

the two electrodes of said pair may be identical and be each placed on a relief, the two reliefs having different heights;

the electrodes of said pair may be of different sizes and are each placed on the surface of a relief, the two reliefs having identical heights;

said reliefs may be placed so that the electrodes of said pair are facing each other;

said reliefs may be placed such that the electrodes of said pair are aligned relative to the flow direction of the liquid;

a reference electrode may be placed on one side of the channel, facing the electrodes of said pair placed on the surface of two reliefs, the device furthermore comprising a device for measuring the voltage between one of the electrodes of said pair and the reference electrode, and a device for measuring the voltage between the other electrode of said pair and the reference electrode;

the channel may comprise a bend having an inner flow surface on at least a part of which is placed one of the electrodes of said pair, and a outer flow surface on at least a part of which is placed the other electrode of said pair;

the channel may comprise at least two successive half-bends each having an outer flow surface on at least a part of each of which is placed one of the electrodes of said pair;

one of the electrodes of said pair may be placed on the surface of an accelerating structure capable of accelerating the flow of the liquid next to the electrode relative to the flow of the liquid in contact with the other electrode of said pair;

the channel may comprise a structure for recirculating the liquid that is capable of making the flow of liquid recirculate next to one of the electrodes of said pair, the other electrode of said pair being placed in a region of direct flow of the liquid;

the structure for recirculating the liquid may consist of an indentation in the surface of the channel;

the structure for recirculating the liquid may consist of an abrupt widening of the channel;

the electrodes of said pair may be separated by a distance of between 3 and 1000 times the thickness of the electrical double layer;

the device may comprise at least two of the different devices above.

The invention also relates to a liquid aspirating/dispensing device, of needle or cone type, having a free end, and comprising next, to its free end, a device for measuring the flow rate of a conductive liquid (as above).

The device according to the invention is simpler than that proposed by J. Collins and A. P. Lee in that a voltage generator is not required. Furthermore, there is no risk of hydrolyzing the solution by making a current flow through it.

The device according to the invention is compact and may be located in the cross section of a channel in direct contact with the conductive liquid drawn up or dispensed, unlike the device proposed by Karin D. Caldwell and Marcus N. Myers, which requires the length of channel located between the measurement electrodes to be sacrificed.

The compact nature of the device according to the invention enables it to be integrated, in a given microsystem, into a plurality of structures which are different, and therefore operate differently, so as to remove from flow rate estimation relationships certain physical properties of the liquid, such as the conductivity, the permittivity and the zeta potential.

Furthermore, it is possible to integrate it or them onto an electronic chip.

BRIEF DESCRIPTION OF THE DRAWINGS

Other features of the invention will be set forth in the detailed description below, made with reference to the figures which show, respectively.

DETAILED DESCRIPTION OF THE INVENTION

The invention uses the fact that convective-diffusive equilibrium of the charge distribution in the electrical double layer is modified as a function of the fluid flow either over only one of the two electrodes, or over both electrodes, but differently from one electrode to the other, in order to measure the flow rate of an electrically conductive liquid flowing, along a defined direction, in a fluidic channel having a millimeter-to-micron-sized transverse dimension.

A first embodiment of a device for implementing the above method consists in providing one or more reliefs, of different heights, that protrude into the cavity of a liquid flow channel so as to locally modify the hydrodynamic conditions of the liquid flow. Thus, the geometry characteristics of the channel, along the flow axis, next to one of the electrodes are different to the geometry characteristics of the channel, along the flow axis, next to the other electrode of said pair. In this way, the flow velocity fields in the diffuse layers at the interface of each electrode are different.

Figures 1, 2:
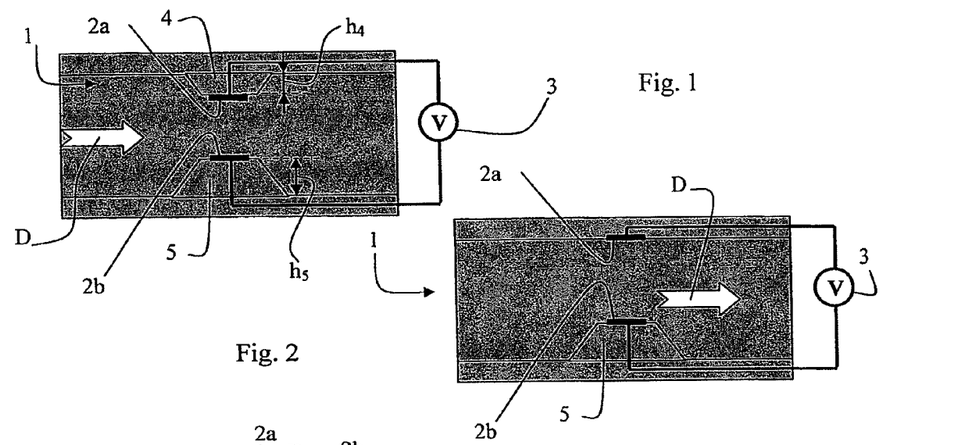
FIGS. 1 to 4, a schematic view in longitudinal cross section of a device according to four variants of a first embodiment in which the electrodes of a pair are identical and placed on reliefs of different heights.

A first variant of this first embodiment of a flow rate measurement device according to the invention is illustrated in FIG. 1. This device comprises a channel 1, a pair of measurement electrodes 2a-2b and a device 3 for measuring the voltage between these electrodes. When the conductive liquid makes contact with the electrodes, an electrical double layer of defined height δ forms at the interface of each electrode.

The electrodes 2a, 2b are placed facing each other on either side of the channel, each on a relief 4, 5, placed on the surface of the channel 1 in contact with the liquid and protruding into the channel. Alternatively, the reliefs may be angularly offset at any angle and do not necessarily face one another.

These protruding reliefs 4, 5 cause the flow of the fluid to be modified. According to this version of the first embodiment shown in FIG. 1, the relief 4 has a height $h_4$ less that the height $h_5$ of the relief 5.

The reliefs 4 and 5 modify the hydrodynamic conditions of the flow in the channel 1. The height difference between the reliefs 4 and 5 results in a difference in the hydrodynamic conditions of the flow in contact with the electrodes 2a and 2b. The convective-diffusive equilibrium of the charge distribution in the electrical double layer at the interface of the electrode 2a is, consequently, different from the convective-diffusive equilibrium of the charge distribution in the electrical double layer at the interface of the electrode 2b. Consequently, the electrical potential of the electrode 2a is different from the electrical potential of the electrode 2b. This difference is measured by the device 3 and allows the flow rate of the liquid in the channel to be calculated following a relationship giving this flow rate as an increasing function of the voltage. This relationship is obtained by a calibration process, or by modeling the coupled electrokinetic and hydrodynamic effects.

As shown in FIG. 2, the height of the relief 4 may be zero provided that the height of the relief 5 is nonzero. In this case, one of the electrodes 2b of the pair of measurement electrodes is placed on a surface of the relief 5 substantially parallel to the flow direction D of the liquid, and the other electrode 2a is placed facing the first electrode 2b.

Figures 3, 4, 5:
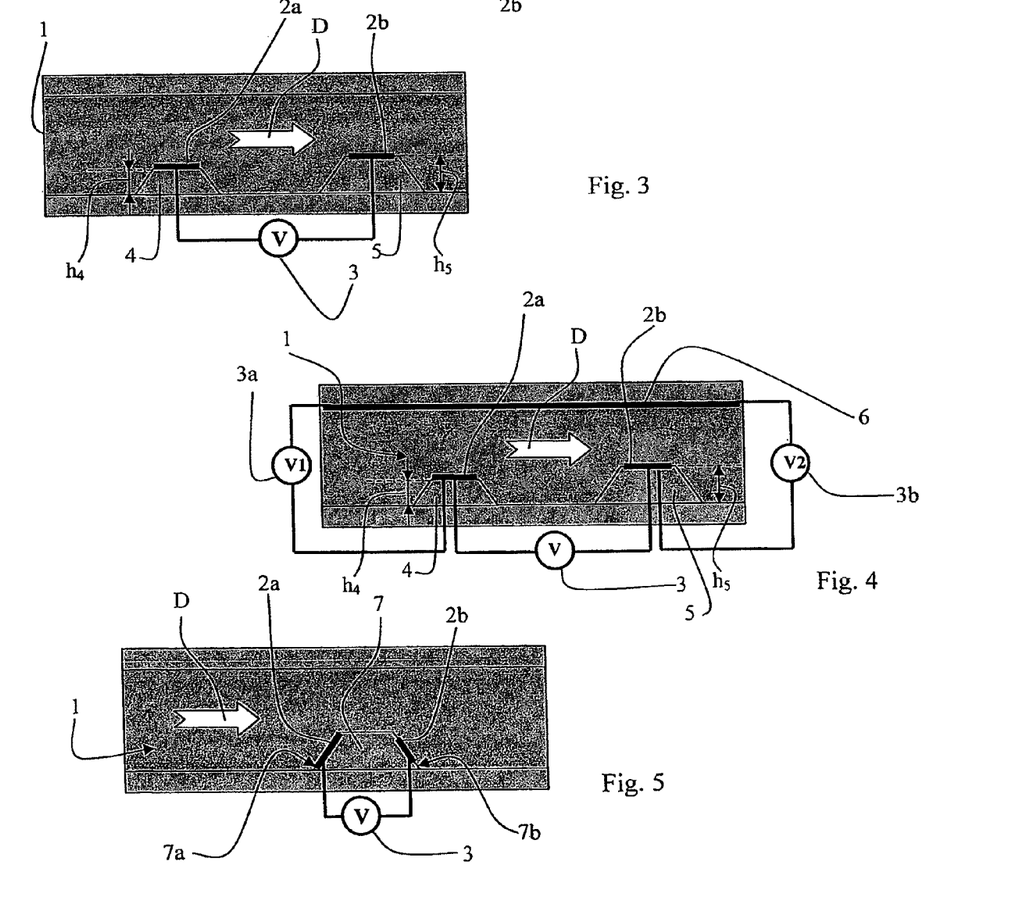
FIG. 5, a schematic view in longitudinal cross section of a device according to a second embodiment in which the electrodes of a pair of located on two sides of a relief presenting different hydrodynamic conditions.

According to a third variant of the first embodiment according to the invention, shown in FIG. 3, the two measurement electrodes 2a and 2b are identical and are each placed on a relief, respectively 4 and 5, substantially parallel to the flow direction D of the liquid. The two reliefs 4 and 5 are of different heights, respectively $h_4$ and $h_5$. Because the hydrodynamic conditions next to the electrode 2a are different from the hydrodynamic conditions next to the electrode 2b, since the reliefs are of different heights, the flow of the liquid modifies the structure of the electrical double layer at the interface of each electrode 2a-2b. The electrical potential of each electrode may be measured by the measurement device 3, and this potential difference allows the flow rate of the liquid to be measured.

In FIG. 3, the relief 4 is located upstream relative to the relief 5.

In the variant illustrated in FIG. 3, the reliefs 4 and 5 are placed such that the electrodes are aligned relative to the flow direction of the liquid. Thus, the reliefs may be angularly offset at any angle whilst being longitudinally offset.

Figure 8:
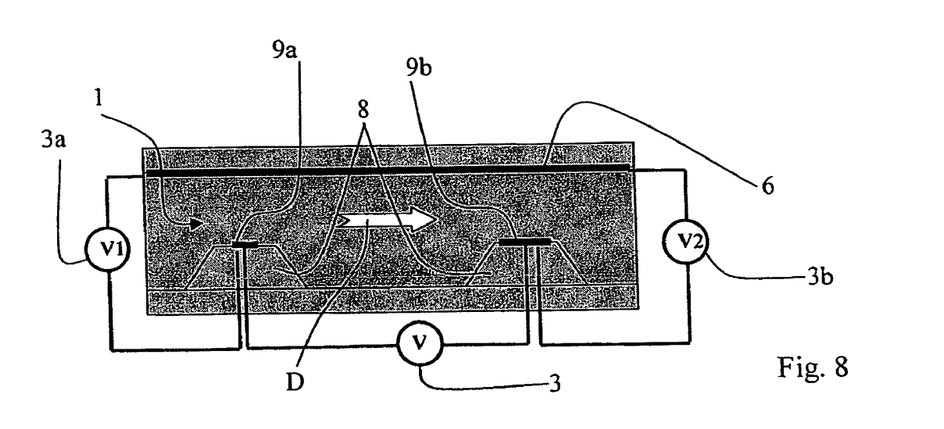

So as to be able to measure the flow rate of the liquid in the channel independently of the conductivity of the liquid, the method according to the invention may employ the device according to the fourth variant, illustrated in FIG. 4, or the eighth variant, illustrated in FIG. 8.

In this device, a reference electrode 6 is placed on the surface of the channel 1 facing the measurement electrodes 2a-2b placed on the surface of the two reliefs 4 and 5. The device furthermore comprises a device 3a for measuring the voltage V1 between the electrode 2a and the reference electrode 6, and a device 3b for measuring the voltage V2 between the electrode 2b and the reference electrode 6.

The flow of the liquid is then established during step a) of the measurement method, a voltage measurement step b) consists in measuring the voltage V1 between one of the electrodes of said pair of measurement electrodes and the reference electrode 6, and in measuring the voltage V2 between the other electrode of said pair of measurement electrodes and the reference electrode 6.

The voltages measured by the measurement apparatus 3, 3a and 3b allow, during step c), the flow rate of the liquid to be deduced, independently of the conductivity of the liquid.

This is because, for each voltage V1 and V2, the relationship (obtained by a calibration process, or by modeling the coupled electrokinetic and hydrodynamic effects) gives the flow rate as an increasing function of the voltage.

In each of the voltage/flow rate relationships associated with each electrode, the voltage is inversely proportional to the conductivity of the liquid. The conductivity can therefore be eliminated by obtaining a ratio of these relationships. Thus a relationship between the flow rate and the two voltages V1, V2 in which the conductivity does not feature is obtained.

According to a second embodiment illustrated in FIG. 5, the device for measuring the flow rate comprises a channel 1, two measurement electrodes 2a-2b of different sizes, placed, respectively, on an upstream side 7a and a downstream side 7b of a relief 7, relative to the flow direction D of the liquid. Thus, the hydrodynamic conditions (flow velocity fields in the diffuse layers) are different next to the two electrodes 2a and 2b. As described above, these differences in the hydrodynamic conditions are used to modify differently the convective-diffusive equilibrium of the charge distribution in the electrical double layer at the interface of the electrodes $2a$ and $2b$ so as to measure a potential difference between these two electrodes and to deduce the flow rate of the liquid therefrom.

Figure 6:
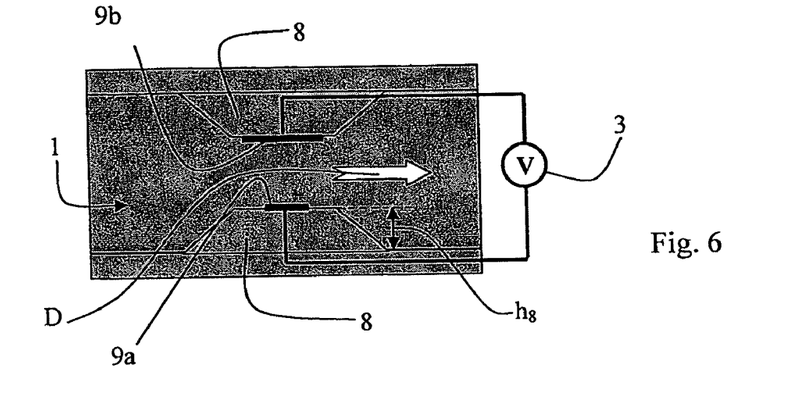
FIGS. 6 to 8, a schematic view in longitudinal cross section of a device according to three variants of a third embodiment in which the electrodes of a pair are different and placed on reliefs of identical heights.

According to a third embodiment illustrated in FIG. 6, the two reliefs 8 used are of identical height $h_8$. The pair of measurement electrodes used comprise two differently sized electrodes 9a-9b.

Figure 7:
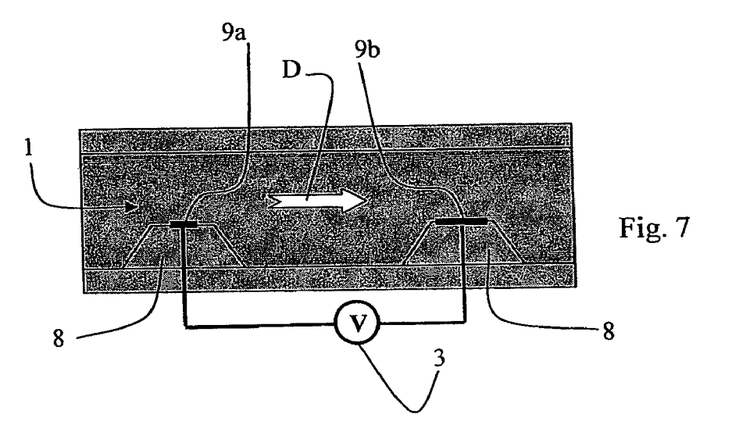

According to the first variant of the third embodiment illustrated in FIG. 7, the reliefs 8 are placed in the channel such that the electrodes that they bear are aligned relative to the flow direction D of the liquid. They may also be angularly offset.

As illustrated in FIG. 8, the preceding device may also comprise a reference electrode 6 placed on the surface of the channel 1 facing the measurement electrodes 9a-9b placed on the surface of the two reliefs 8. As in the case of the device illustrated in FIG. 4, the potential differences measured between the electrodes 2a, 2b and 6 allow the flow rate to be measured independently of the conductivity of the liquid.

Figure 9:
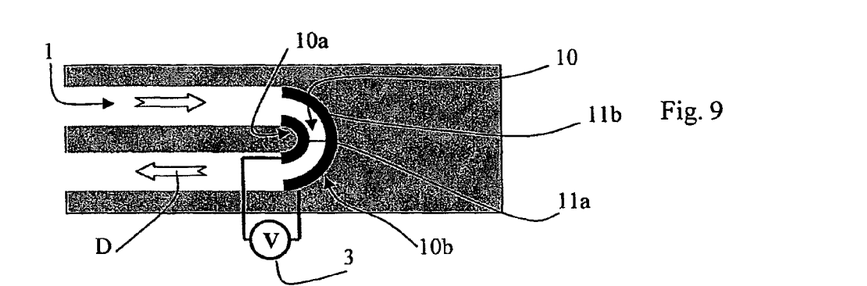
FIGS. 9 and 10, a schematic top view in longitudinal cross section of a device according to two variants of a fourth embodiment in which the channel has a bend.
Figures 10, 11:
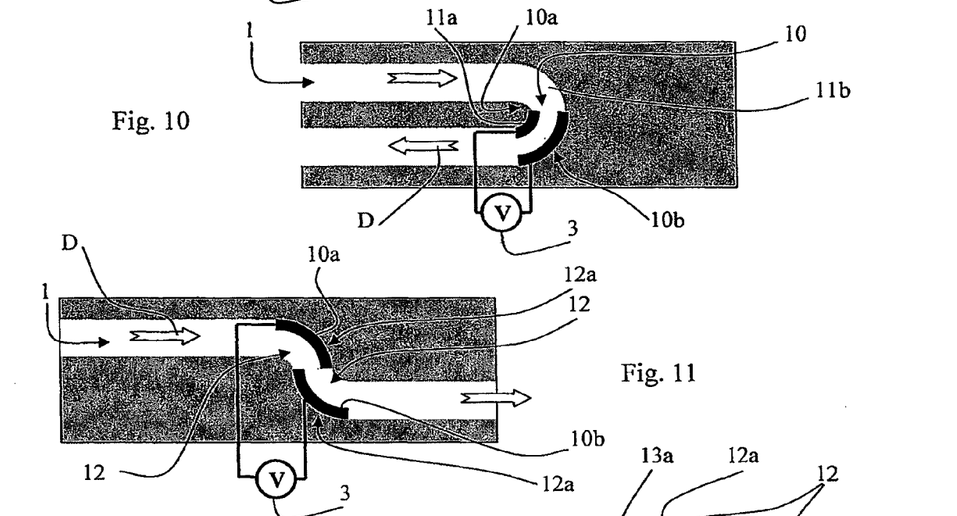
FIGS. 11 and 12, a schematic top view in longitudinal cross section of a device according to two variants of a fifth embodiment in which the channel has two half-bends.

A fourth embodiment of the invention, illustrated in FIGS. 9 and 10, consists in providing a bend 10 in the channel 1. This bend has an inner flow surface 10a and an outer flow surface 10b. A measurement electrode 11a is placed on the inner flow surface 10a and a measurement electrode 11b is placed on the outer flow surface 10b. Since the hydrodynamic conditions at the inner flow surface 10a of the bend 10 being different for the hydrodynamic conditions at the outer flow surface 10b, this configuration modifies the structure of the electrical double layer at the interface of each electrode 11a-11b and, consequently, modifies the electrical potential of each electrode. The electrical potential difference between the two electrodes 11a and 11b is measured by the measurement device 3.

According to a variant of this fourth embodiment, shown in FIG. 10, the measurement electrodes 11a and 11b may extend only over only a part of the respective inner and outer flow surfaces 10a and 10b of the bend 10.

Figure 12:
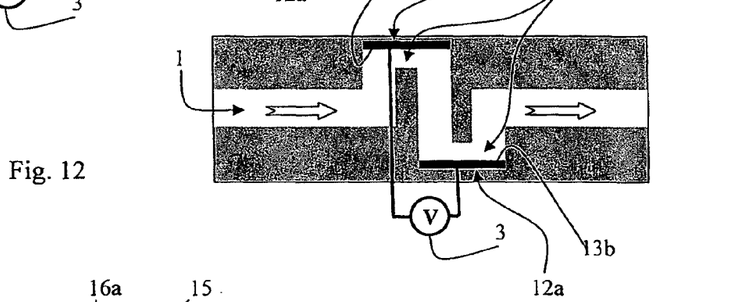

According to a fifth embodiment illustrated in FIGS. 11 and 12, a device for measuring the flow rate according to the invention comprises a channel equipped with two successive half-bends 12. Measurement electrodes 13a-13b are placed on at least a part of the outer flow surface 12a of each half-bend 12.

Figure 13:
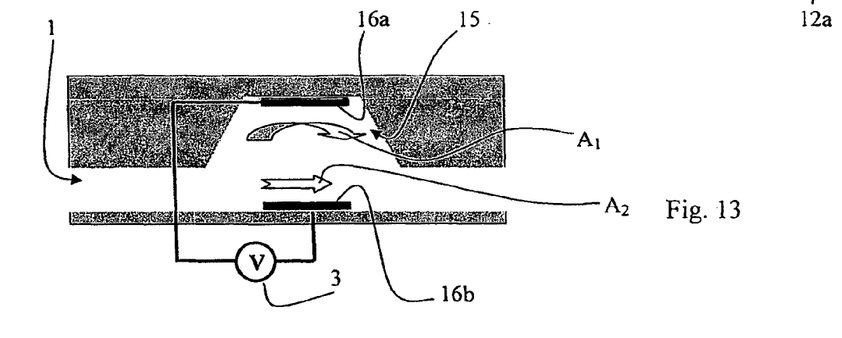
FIG. 13, a schematic view in longitudinal cross section of a device according to a sixth embodiment in which the channel has an accelerating structure.

A sixth embodiment of a device according to the invention is illustrated in FIG. 13. This device comprises a channel 1 equipped with a structure 15 for accelerating the flow of the liquid. A measurement electrode 16a is placed in this accelerating structure capable of locally accelerating the flow of the liquid, that is to say next to the electrode 16a. The electrode 16b is placed facing the electrode 16a in a region of the channel where the flow of the liquid is steady. The mutually facing arrangement is not essential.

The acceleration of the flow of the liquid (illustrated by the arrow $A_1$), relative to the steady flow of the liquid (illustrated by the arrow $A_2$) modifies the hydrodynamic conditions in contact with the electrode 16a relative to the hydrodynamic conditions in contact with the electrode 16b, this modification being dependent on the flow rate of the liquid. It follows that the structure of the electrical double layer of the electrode 16a is different from the structure of the electrical double layer of the electrode 16b so that a potential difference may be measured, by the measurement apparatus 3, between the two electrodes 16a-16b. The structure for accelerating the liquid therefore allows the flow rate of the flow of liquid to be measured.

Figure 14:
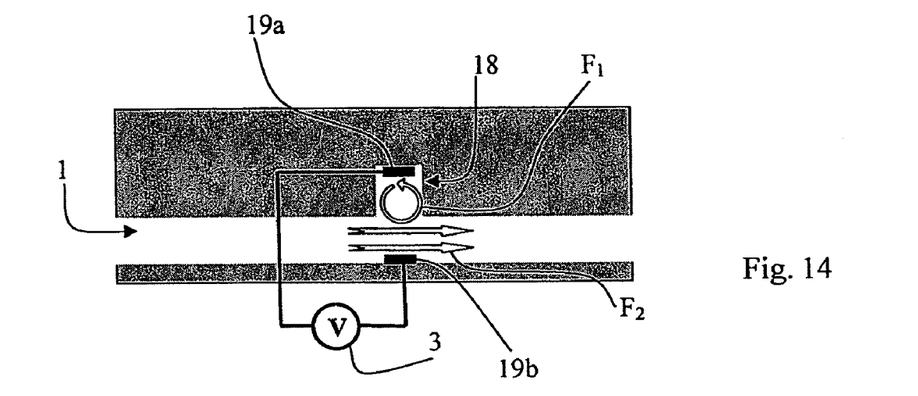
FIGS. 14 and 15, a schematic view in longitudinal cross section of a device according to two variants of a seventh embodiment in which the channel is provided with a recirculation structure.
Figure 15:
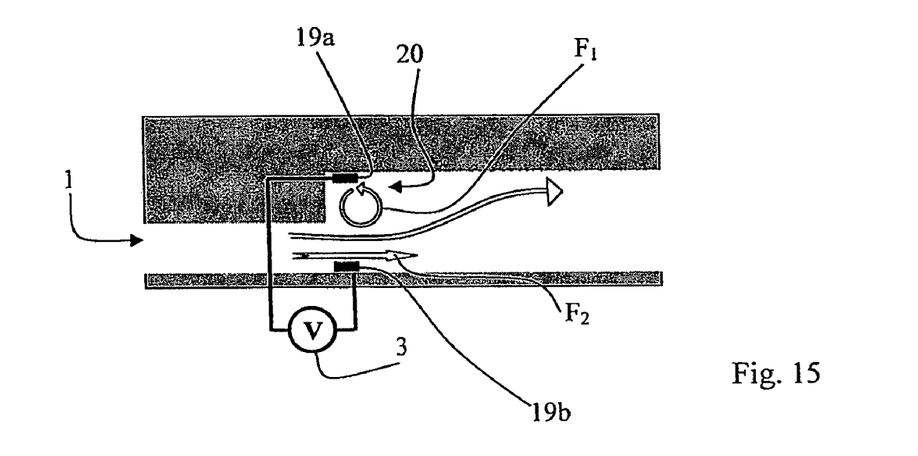
Figure 16:
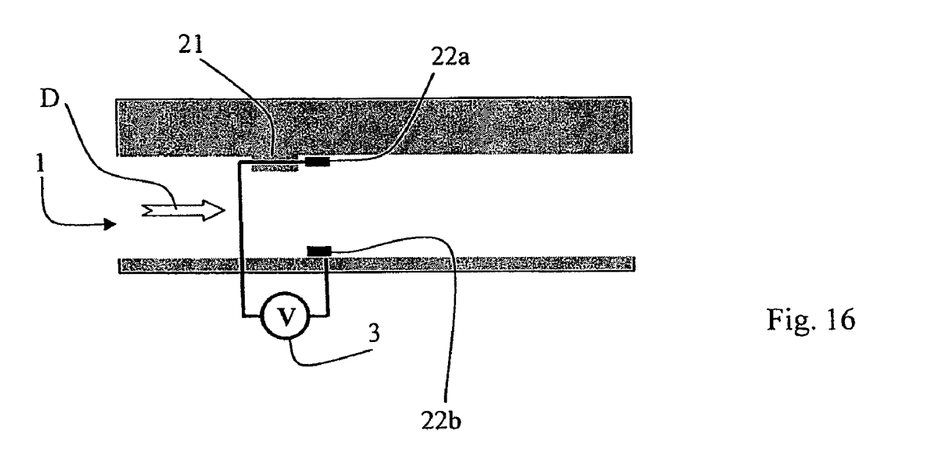
FIG. 16, a schematic view in longitudinal cross section of a device according to an eighth embodiment in which the channel has an obstacle upstream of one of the electrodes.

A seventh embodiment of a device according to the invention is illustrated in FIGS. 14, 15 and 16. According to this seventh embodiment, a device according to the invention comprises a channel equipped with a structure for recirculating the liquid. In FIG. 14, this structure for recirculating the liquid consists of an indentation 18 in the surface of the channel 1. A measurement electrode 19a is placed at the bottom of the indentation 18 such that, when the liquid flows in the channel 1, a recirculation $F_1$ of the liquid flow occurs over the surface of the electrode 19a. Another measurement electrode 19b is placed facing the electrode 19a in a region $F_2$ of direct flow of the liquid.

According to another variant illustrated in FIG. 15, the structure for recirculating the liquid may consist of an abrupt widening 20 of the channel 1.

In these two variants of the seventh embodiment, the recirculation of the liquid over only one of the measurement electrodes and the preservation of a direct flow in contact with only the other of the measurement electrodes causes a difference in hydrodynamic conditions to be established next to the electrodes such that the flow velocity fields at the interface of each electrode are different. This leads the electrical double layers at the interface of each of these electrodes to have different structures. As above, the difference in the convective-diffusive equilibrium of the charge distribution in the electrical double layer results in a voltage, measured by the device 3. The flow rate of the fluid may then be deduced from this potential difference.

According to an eighth embodiment illustrated in FIG. 16, a flow rate measurement device according to the invention may comprise an obstacle 21 placed upstream of only one of the measurement electrodes 22a-22b.

More generally, the reliefs may be arranged any how provided that the hydrodynamic conditions next to one of the electrodes that they support are different. Thus, in all the embodiments described above, and in their variants, the measurement electrodes of said at least one pair of electrodes are preferably separated by a distance of between 3 and 1000 times the thickness $\delta$ of the electrical double layer and, more preferably, about 10 times the thickness $\delta$ of the electrical double layer. The latter may have a thickness of between about a few nanometers to about a micron, the minimum distance between the two electrodes being about a few tens of nanometers to about ten microns.

According to one embodiment of a measurement device according to the invention, at least two different devices, from the eight embodiments described above and their variants, are placed in the channel. The implementation of this flowmeter allows the flow rate of the liquid to be calculated independently of the properties of the liquid: conductivity, permittivity, zeta potential, density, temperature. If a fluidic coupling is performed, two devices will be employed simultaneously either in parallel or in series.

The flow rate measurement devices may, for example, be made on silicon using the techniques of microelectronics. Thus the devices presented in FIGS. 9 to 16 may be produced according to the following process:

a thick (about 2 μm) layer of silicon oxide ($SiO_2$) is formed;
a thin (about 300 nm) layer of a metal (such as gold or platinum) is deposited and then etched to form the electrodes 10a, 10b, 13a, 13b, 16a, 16b, 19a, 22a, 22b;
a thick (several tens to hundreds of microns), photosensitive, dry film is deposited and then etched to form the microfluidic channels; and
a polycarbonate or glass cap is bonded onto the dry film using an adhesive screen-printing method.

The devices presented in FIGS. 1 to 8 comprise reliefs that could be produced in silicon by chemical etching, for example using a 44% KOH solution. After this step of preparing the substrate in which channels are formed with the desired reliefs, the steps described above for producing the electrodes and then the microfluidic channels can be carried out.

Advantageously, a device for measuring the flow rate of a conductive liquid (as above) may be provided on the free end of an aspiration/dispensing device, of cone or needle type.

According to other embodiments, the means arranged so that the geometry characteristics of the channel next to one of the electrodes are different from the geometry characteristics of the channel next to the other electrode of said pair are reliefs such that the electrodes of each pair are:
one concave, the other convex; or
one concave, the other planar; or
one convex, the other planar.

The invention claimed is:

1. A method of measuring the flow rate of an electrically conductive liquid flowing in the laminar flow regime, along a defined direction, in a device comprising a fluidic channel (1) having a millimeter- to-micron-sized transverse dimension, and at least a pair of measurement electrodes, an electrical double layer forming at the interface of each electrode with the conductive liquid, characterized in that the geometry characteristics of the channel, in the direction of the flow, next to one of the electrodes are different to the geometry characteristics of the channel, in the direction of the flow, next to the other electrode of said pair, so that the flow velocity fields in the diffuse layers facing each electrode are different, and so that the convective-diffusive charge equilibrium of the electrical double layer at the interface of each electrode is different, the method comprising the following steps:
a) establishing the flow of the liquid;
b) measuring a voltage between the electrodes of said pair of electrodes; and
c) deducing the flow rate of the liquid therefrom.

2. The method as claimed in claim 1, in which the device furthermore comprises a reference electrode, step b) also consisting in measuring the voltage between one of the electrodes of said pair of measurement electrodes and the reference electrode, and the voltage between the other electrode of said pair of measurement electrodes and the reference electrode, and step c) furthermore consisting in using the voltages measured in step b) to deduce the flow rate of the liquid independently of the conductivity of the liquid.

3. The method as claimed in claim 1, in which the device comprises a single pair of measurement electrodes, at least one of the electrodes of said pair being placed on a relief that protrudes into the channel.

4. The method as claimed in claim 1, in which the device comprises a single pair of measurement electrodes, the channel of the device being provided with a bend, and one of the electrodes of said pair being placed on at least a part of an inner flow surface of the bend, the other electrode of said pair being placed on at least a part of an outer flow surface of the bend.

5. The method as claimed in claim 1, in which the device comprises a single pair of measurement electrodes, and the channel of the device may be provided with at least two successive half-bends, each electrode of said pair being placed on at least a part of an outer flow surface of each half-bend.

6. The method as claimed in claim 1, in which the device comprises a single pair of measurement electrodes, and a structure for accelerating the flow of the liquid in contact with one of the electrodes of said pair relative to the flow of the liquid in contact with the other electrode of said pair.

7. The method as claimed in claim 1, in which the device comprises a single pair of measurement electrodes and a structure for recirculating the liquid in contact with one of the electrodes of said pair, a direct flow being maintained in contact with the other electrode of said pair.

8. The method as claimed in claim 1, in which the device comprises at least two different means taken from the group consisting of a protruding relief, a bend, two successive half-bends, a structure for accelerating the flow of the liquid and a structure for recirculating the liquid.

9. A device for measuring the flow rate of an electrically conductive liquid flowing in the laminar flow regime, along a defined direction, comprising a channel, a pair of measurement electrodes, and at least one device for measuring the voltage between the electrodes of said at least one pair, an electrical double layer forming at the interface of each electrode with the conductive liquid, in which it comprises means arranged so that, when the conductive liquid flows in the channel, the flow velocity fields in the diffuse layers facing each electrode are different, so that the convective-diffusive charge equilibrium of the electrical double layer at the interface of each electrode is different.

10. The flow rate measurement device as claimed in claim 9, in which the means consist of at least one relief placed on the surface of the channel in contact with the liquid and protruding into the channel.

11. The flow rate measurement device as claimed in claim 10, in which one of the electrodes of said pair is placed on a surface in relief, and the other electrode of said pair is placed on the surface of the channel, facing the first electrode.

12. The flow rate measurement device as claimed in claim 10, in which one of the electrodes of said pair may be placed on an upstream side of the relief relative to the flow direction of the liquid, and the other electrode of said pair may be placed on a downstream side of the relief relative to the flow direction of the liquid.

13. The flow rate measurement device as claimed in claim 10, in which the two electrodes of said pair are identical and are each placed on a relief, the two reliefs having different heights.

14. The flow rate measurement device as claimed in claim 10, in which the electrodes of said pair may be of different sizes and are each placed on the surface of a relief, the two reliefs having identical heights.

15. The flow rate measurement device as claimed in claim 13, in which said reliefs are placed so that the electrodes of said pair are facing each other.

16. The flow rate measurement device as claimed in claim 13, in which said reliefs are placed such that the electrodes of said pair are aligned relative to the flow direction of the liquid.

17. The flow rate measurement device as claimed in claim 14, in which a reference electrode is placed on one side of the channel, facing the electrodes of said pair placed on the surface of two reliefs, the device furthermore comprising a device for measuring the voltage between one of the electrodes of said pair and the reference electrode, and a device for measuring the voltage between the other electrode of said pair and the reference electrode.

18. The flow rate measurement device as claimed in claim 9, in which the channel comprises a bend having an inner flow surface on at least a part of which is placed one of the electrodes of said pair, and a outer flow surface on at least a part of which is placed the other electrode of said pair.

19. The flow rate measurement device as claimed in claim 9, in which the channel comprises at least two successive half-bends each having an outer flow surface on at least a part of each of which is placed one of the electrodes of said pair.

20. The flow rate measurement device as claimed in claim 9, in which one of the electrodes of said pair is placed on the surface of an accelerating structure capable of accelerating the flow of the liquid next to the electrode relative to the flow of the liquid in contact with the other electrode of said pair.

21. The flow rate measurement device as claimed in claim 9, in which the channel comprises a structure for recirculating the liquid, capable of making the flow of liquid recirculate next to one of the electrodes of said pair, the other electrode of said pair being placed in a region of direct flow of the liquid.

22. The flow rate measurement device as claimed in claim 21, in which the structure for recirculating the liquid consists of an indentation in the surface of the channel.

23. The flow rate measurement device as claimed in claim 21, in which the structure for recirculating the liquid consists of an abrupt widening of the channel.

24. The flow rate measurement device as claimed in claim 9, in which the electrodes of said pair are separated by a distance of between 3 and 1000 times the thickness of the electrical double layer.

25. A flow rate measurement device for implementing the method as claimed in claim 8, in which the device comprises at least two different means taken from the group consisting of a protruding relief, a bend, two successive half-bends, a structure for accelerating the flow of the liquid and a structure for recirculating the liquid.

26. A liquid aspirating/dispensing device, of needle or cone type, having a free end, characterized in that said device comprises, next to its free end, a device for measuring the flow rate of a conductive liquid as claimed in claim 9.

* * * * *

UNITED STATES PATENT AND TRADEMARK OFFICE
CERTIFICATE OF CORRECTION

PATENT NO.        : 8,381,598 B2                                  Page 1 of 1
APPLICATION NO.   : 13/002196
DATED             : February 26, 2013
INVENTOR(S)       : Achard et al.

It is certified that error appears in the above-identified patent and that said Letters Patent is hereby corrected as shown below:

In the Specifications

Column 3,
Lines 16 and 17, in the equation, "$k_h$" should read --$k_b$--.

Signed and Sealed this
Twenty-eighth Day of May, 2013

Teresa Stanek Rea
*Acting Director of the United States Patent and Trademark Office*